(12) United States Patent
Wulforst et al.

(10) Patent No.: US 6,272,212 B1
(45) Date of Patent: Aug. 7, 2001

(54) TELEPHONE INTERCEPT APPARATUS AND METHOD FOR INTERCEPTING AN OUTGOING TELEPHONE NUMBER

(76) Inventors: Howard E. Wulforst, 1275 Antelope Valley Rd., Reno, NV (US) 89506; David A. Sandler, 275 Washington Ave., St. James, NY (US) 11780

( * ) Notice: Subject to any disclaimer, the term of this patent is extended or adjusted under 35 U.S.C. 154(b) by 0 days.

(21) Appl. No.: 09/228,090

(22) Filed: Jan. 11, 1999

(51) Int. Cl.[7] ................................................. H04M 1/66
(52) U.S. Cl. ............................ 379/199; 379/38; 379/45; 379/350
(58) Field of Search .................................. 379/188, 199, 379/200, 201, 37, 38, 45, 40, 47, 48, 216, 350, 355

(56) References Cited

U.S. PATENT DOCUMENTS

| | | | |
|---|---|---|---|
| 3,681,532 | * 8/1972 | Simon | 379/36 |
| 4,450,320 | * 5/1984 | Ostermann et al. | 379/45 |
| 4,747,120 | * 5/1988 | Foley | 379/38 |
| 5,161,180 | * 11/1992 | Chavous | 379/45 |
| 5,408,525 | * 4/1995 | Eldering | 379/162 |
| 5,425,085 | * 6/1995 | Weinberger et al. | 379/112 |

\* cited by examiner

Primary Examiner—Ahmad Matar
Assistant Examiner—Benny Q. Tieu
(74) Attorney, Agent, or Firm—Sonnenschein Nath & Rosenthal

(57) ABSTRACT

A telephone intercept device interposed between a telephone company network and telecommunications equipment in a consumer unit. The telephone intercept device monitors outgoing telephone numbers and disconnects the telecommunications equipment from the telephone company network, when necessary to redirect the telephone call to a different telephone number. An electrically-controlled switching circuit disconnects the equipment from the network. A first circuit determines off-hook condition to latch power for the device from the telephone company network. A second circuit mimics an off-hook state to the telephone company to allow the device to dial out the substitute number. A memory contains the target telephone numbers for redirection, as well as the associated redirected telephone number. The intercept device may also be used to communicate to remote monitoring stations the occurrence of an event associated with the consumer unit. A method for intercepting telephone numbers is also disclosed.

14 Claims, 4 Drawing Sheets

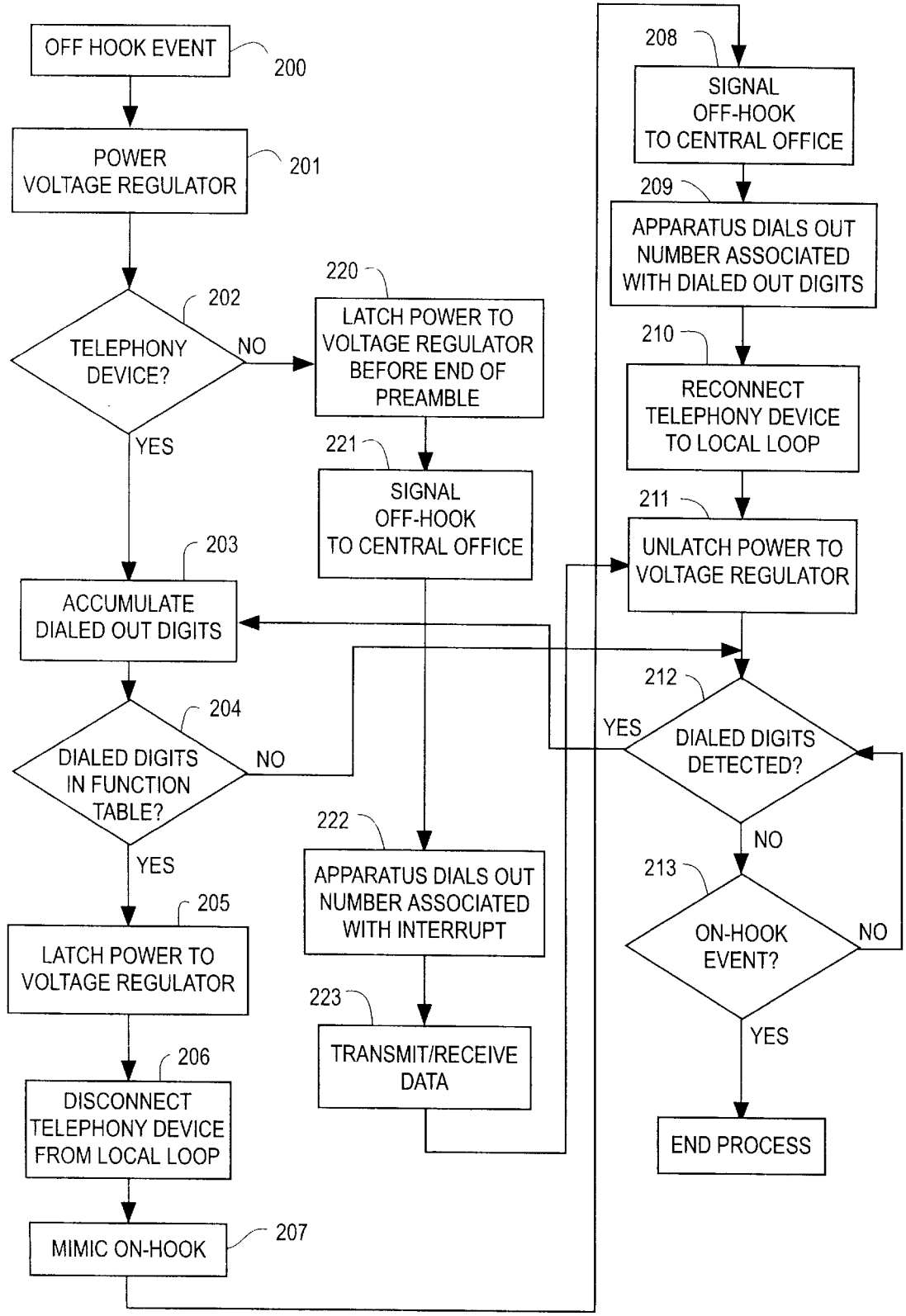

TELEPHONE INTERCEPT APPARATUS AND METHOD FOR INTERCEPTING AN OUTGOING TELEPHONE NUMBER

BACKGROUND OF THE INVENTION

1. Field of the Invention

The present invention relates in general to telephone equipment and, in particular, to an apparatus for monitoring outgoing phone calls toward intercepting and redirecting certain telephone calls.

2. Background Art

Home alarm systems are common-place. These systems are generally programmed upon installation to dial-out information via a standard telephone company network information to a central monitoring company selected by the alarm installer. Reprogramming of these alarm systems (and more particularly the telephone number of the monitoring company) is often difficult or cumbersome. Nevertheless, a home owner may be desirous of changing monitoring companies without the expense and/or aggravation of reprogramming the alarm system. Consequently, it is an object of the present invention to provide a device that can intercept telephone calls from home alarms and redirect those calls to different monitoring companies.

The number of long distance telephone companies has increased. While some long distance companies can be directly associated with a consumer's telephone, some of these companies are accessed by dialing a prefix in the form of "10-10-xxxx" before dialing the telephone number of the desired called party. Consequently, it is another (and potentially alternate) object of the present invention to provide a device that can automatically dial this prefix in response to the consumer dialing a standard long distance call (i.e. "1" and then the telephone number).

Additionally, there are various events that consumers manually monitor and, then upon occurrence of the event (e.g. low propane pressure) manually call a third party (e.g. the gas company to schedule a propane delivery). Often times the user fails to note the occurrence of the event or cannot timely place the responsive telephone call to the third party. Accordingly, it is a further (potentially alternate) object of the present invention to provide a device that can automatically dial the appropriate third party automatically upon notification of the occurrence of the event.

These and other objects will be apparent to those of ordinary skill in the art having the present drawings, specification and claims before them.

SUMMARY OF THE INVENTION

The present invention discloses, in part, a telephone intercept device interposed between a telephone company network and telecommunications equipment in a consumer unit, such as a home, office or store. The telephone intercept device includes a voltage regulator, an electrically-controlled switching circuit, a first off-hook detection circuit, a second circuit for mimicking an off-hook state, means for capturing digits dialed out by the telecommunications equipment, a memory and control means.

The voltage regulator has a small quiescent current requirement and draws its supply voltage from the telephone company network. The electrically-controlled switching circuit is operably disposed between the telecommunications equipment and the telephone company network.

The off-hook detection (first) circuit is operably disposed between the telephone company network and the voltage regulator. The first circuit is also operably connected to the electrically-controllable switching circuit such that the first circuit operably connects the voltage regulator to the telephone company network upon the telecommunications equipment assuming an off-hook state while the electrically-controlled switching circuit is in its closed state. The second circuit, when operably connected to the telephone company network, mimics an off-hook state.

The intercept device further includes means for capturing each digit from the telecommunications equipment (preferably represented by a DTMF signal), in sequence, into a dialed digit word. The memory contains at least one function word. Each function word has an associated telephone number intended to redirect the original phone call (represented by the captured dialed digit word) to the associated telephone number.

The device additionally includes control means for (i) opening the electrically-controlled switching circuit, (ii) forcing the first circuit to operably connect the voltage regulator to the telephone company network, (iii) activating the second circuit, (iv) waiting for dial-tone from the telephone company network, (v) dialing out the associated telephone number after waiting for the dial tone; and (vi) closing the electrically-controlled switching circuit after dialing out the associated telephone number, the control means operating only when the dialed digit word corresponds to one of the function words stored in memory.

In one embodiment, the control means includes a wave table for generating each possible set of DTMF codes and may further include a filter tuned to remove any non-DTMF code frequencies generated by the control means. Still further the device may include a modulating amplifier for modulating the dialed out associated telephone number. Of course, other DTMF generating techniques and/or specialized IC's could be used instead within the teachings of the present invention.

In one potential embodiment of the telephone intercept device, the device further includes an auxiliary input for receiving signals from a non-telephone based device. In this embodiment, the first circuit can also be activated by said non-telephone based device. Also in this embodiment, the memory further includes a dedicated telephone number associated with the non-telephone based device. Further in this embodiment, in addition to the first control means there is a second control means for servicing the non-telephone based device interrupt.

The second control means is for (i) forcing the first circuit to operably connect the voltage regulator to the telephone company network, (ii) activating the second circuit to mimic an off-hook state, (iii) waiting for dial-tone from the telephone company network, (iv) dialing out the dedicated telephone number after waiting for the dial tone; and (v) transmitting information associated with the non-telephone based device, the second control means operating only upon activation of the non-telephone based device.

BRIEF DESCRIPTION OF THE DRAWINGS

FIG. 3 of the drawings is a block diagram of the general operation of the telephone intercept device.

BEST MODES OF PRACTICING THE INVENTION

Figure 1:
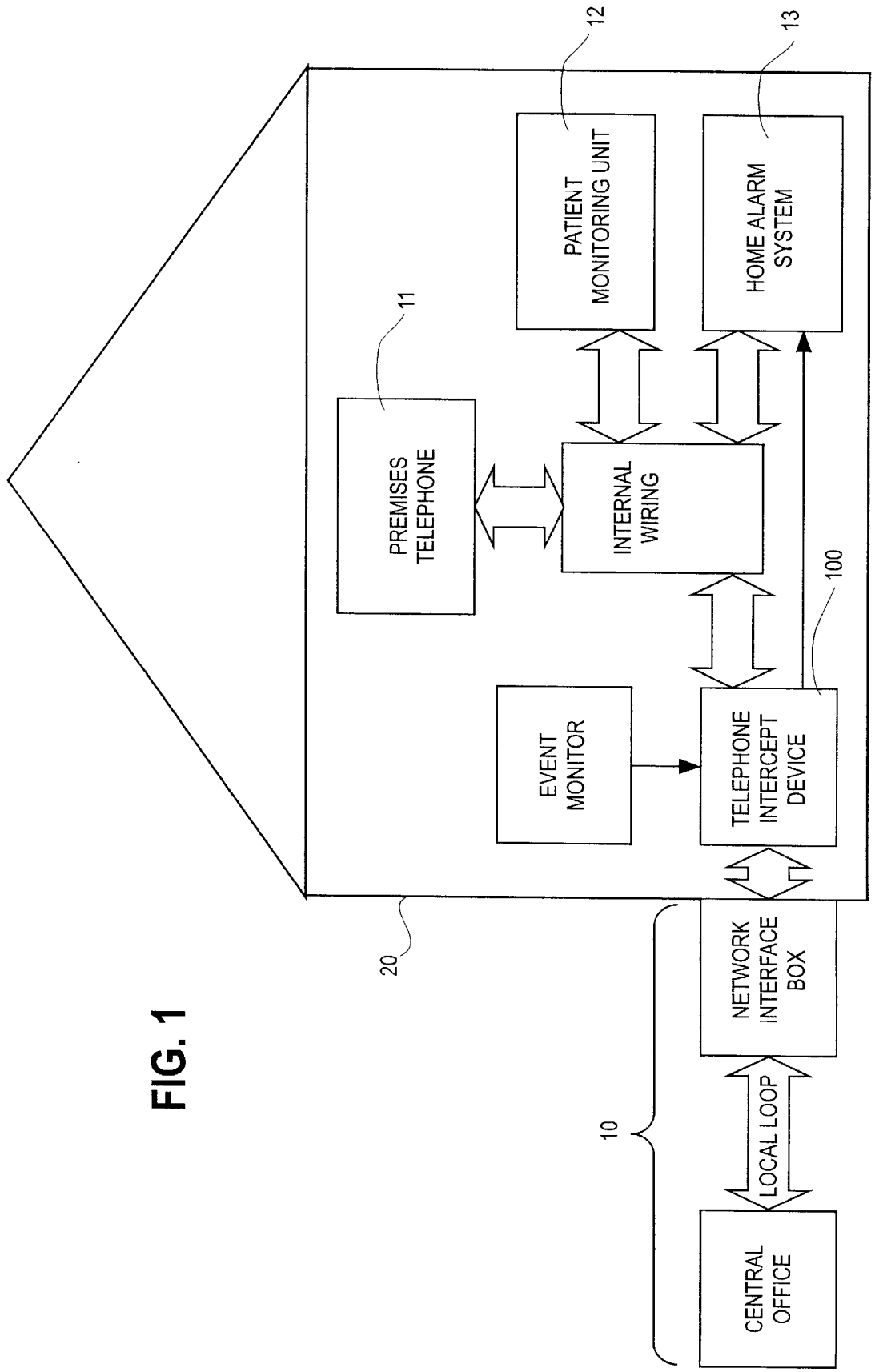
FIG. 1 of the drawings is a block diagram of the interconnection between the telephone company's network, the telephone intercept device and telecommunications equipment within a consumer residence.

While the present invention may be embodied in many different forms, there is shown in the drawings and discussed herein a few specific embodiments with the understanding that the present disclosure is to be considered only as an exemplification of the principles of the invention and is not intended to limit the invention to the embodiments illustrated.

FIG. 1 of the drawings shows telephone intercept device 100 installed between telephone company network 10 and various telecommunications equipment in a consumer unit, such as home 20, office or store, to name a few. As shown in FIG. 1, the various telecommunications equipment can include any of the following: premises telephone 11, patient monitoring unit 12 and home alarm system 13. As is known, premises telephone 11 may be a touch-tone or pulse-dial telephone, corded or cordless. Further premises telephone 11 may also be integrated with other devices such as answering machines, caller id devices and the like.

The patient monitoring units are also known. In brief, these units may consist solely of a miniature RF transmitter for simple user actuation upon the user being in distress. The RF signal is received by a receiver, in turn, activating an automatic dialer to a central monitoring station. Additionally, such equipment can be configured to automatically "dial out" on the occurrence of a physical condition (i.e., a heart attack, sleep apnea or arrhythmia).

In fact, any type of telecommunications equipment can be used in association with telephone intercept device 100 so long as that equipment sends at least one digit (usually in a DTMF format) toward telephone company network 10. Of course, in most instances, the equipment will dial at least seven digits.

In most cases, telephone intercept device 100 will be installed by simply unplugging a modular plug (such as an RJ-11) from the telephone company network 10 (via the network interface box associated with that consumer unit) and plugging the internal wire which leads to that network interface box into a modular jack in the telephone intercept device. Of course, it is also possible to hardwire either the network or internal connection to the telephone intercept device. Additionally, it is also possible to connect any telecommunications equipment directly into the telephone intercept device. For this purpose, the telephone intercept device could even include multiple input jacks to facilitate such an approach.

Telephone intercept device 100 is programmable to conduct various functions. This programming may be done at the factory, at the equipment provider's offices before installation or even on site. Furthermore, on site programming may be accomplished remotely via the telephone company network, as well. Some functions of the telephone intercept device will normally be accessed and programmed by the end user. For instance, telephone intercept device may be programmed to:

Change the consumer's remote alarm-monitoring company without requiring reprogramming or replacement of the home alarm system;

Change the consumer's patient monitoring company without requiring reprogramming or replacement of the patient monitoring system;

Automatically insert the access code of the long distance telephone provider;

Speed dial one or more telephone numbers either preprogrammed or user-programmed; and Communicate the activation of an external trigger event, such as low temperature in a home (to indicate a broken HVAC system); low propane pressure (to indicate a needed refill); activation of a smoke detector or carbon monoxide detector (separate from similar systems which are integrated into remote alarm systems); and other similarly monitorable events.

Figure 2A:
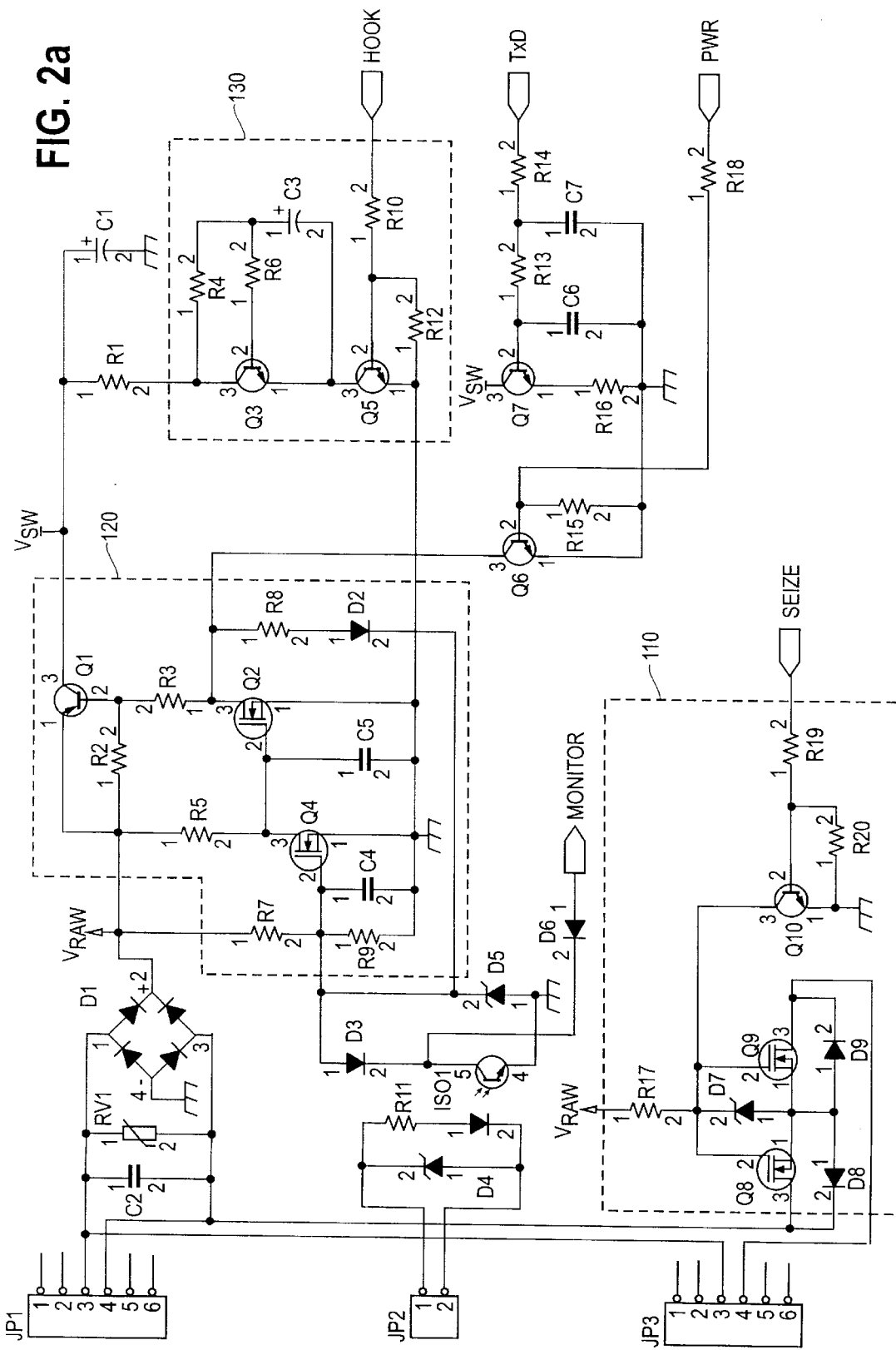
FIGS. 2A and 2B of the drawings are a schematic diagram of one embodiment of the telephone intercept device.
Figure 2B:
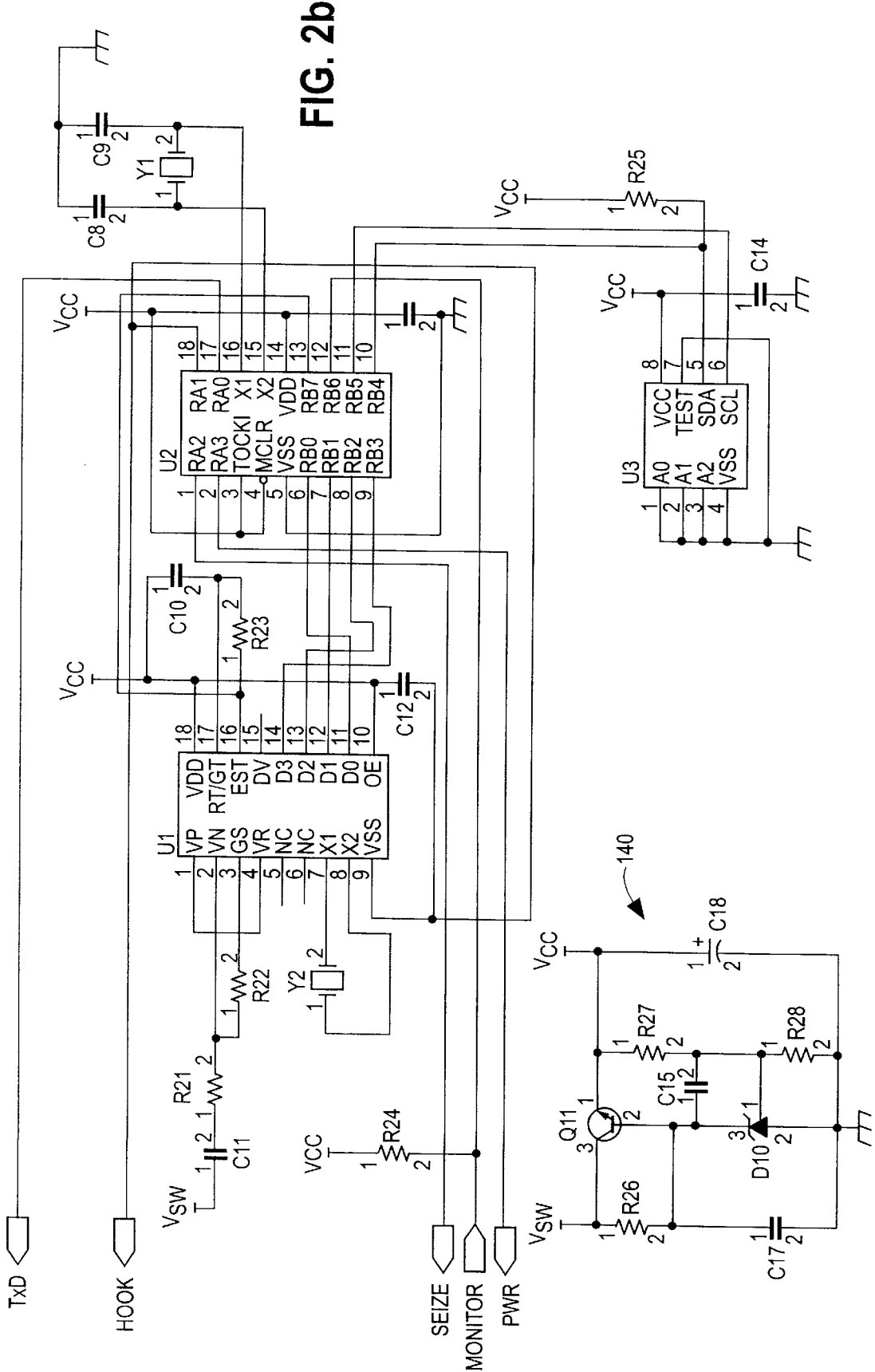

FIGS. 2A and 2B are a schematic block diagram of one embodiment of the telephone intercept device. As shown in those figures, JP3 is a RJ-11 socket to which the telecommunication equipment (e.g. premises telephone 11, patient monitoring unit 12 and home alarm system 13) are operably connected to telephone intercept device 100. Of course, it is contemplated that instead of RJ-11 socket other modular connectors or even hardwired connection can be made to intercept device 100.

The two active wires from the RJ-11 socket are connected to electrically-controlled switching circuit 110. As shown in FIG. 2a, this switching circuit may comprise a discrete AC switch. Among other alternatives, the switching circuit may comprise a DC switching circuit with the understanding that this will prevent the standard ringing signal used in POTS from reaching the telecommunications equipment. Generally, the electrically-controlled switching circuit is maintained in a closed state such that any signal from the telecommunication equipment can pass through the switching circuit to the telephone company network, via Q8 and Q9. As shown, intercept device 100 is connected to the telephone company network via RJ-11 connector JP1. Of course, it is contemplated that instead of this RJ-11 connector other modular connectors or a hardwire connection can be made to the intercept device. Alternatively, it is also possible to connect JP1 to internal wiring in which case intercept device 100 is likely to be connected directly to the telecommunication equipment via JP3. For sake of simplicity, we shall generally refer to connection to the telephone company network with the understanding that both cases are intended thereby.

A first circuit 120 is operably connected on one side to telephone company network 10 and Vraw—the raw signal from the telecommunications equipment associated with the consumer unit. On the other side of transistor Q1 of the first circuit is an operably connected via Vsw to voltage regulator 140 (shown in FIG. 2b). Operably, while the electrically-controlled switching circuit is closed, an off-hook signal from any of the telecommunication equipment causes the first circuit to connect voltage regulator 140 to telephone company network 10, via transistor Q1. This connection provides the only source of energy to voltage regulator 140.

Voltage regulator 140 (FIG. 2b) has a small quiescent current requirement (approximately 10 micro amps) as is required by telephone company network regulations. The circuit must be capable of handling voltage conditions found on a POTS network. Additionally, the preferred voltage regulator, such as the one shown in FIG. 2b, has a very low input capacitance to avoid affecting speech quality when the regulator is inactive. Voltage regulator 140 supplies a TTL level voltage to microprocessor (U1), DTMF detector (U2), and memory (U3).

The intercept device further includes second circuit 130, which mimics an off-hook state and, thus, can be thought of as an electronic hook switch. In the embodiment shown, second circuit is a gyrator circuit. Second circuit 130 is operably connected to telephone company network 10 via first circuit 120. First circuit 120 is controlled such that it maintains a closed state at least during the time period the second circuit operates to mimic the off-hook condition. A predetermined time after the off-hook is received by the central office, the central office provides dial-tone to the telephone intercept device. Thus, intercept device 100 may presume availability of dial tone after that predetermined time plus some additional guard band time. Alternatively, it is contemplated that device 100 could further include a circuit for actively monitoring for the receipt of dial tone from the central office.

The intercept device further includes means for capturing digits in sequence from telecommunications equipment into a dialed digit word. In the usual embodiment, the digits generated by standard telecommunications equipment today are DTMF encoded. However, it is contemplated that the digits could also be pulse dialed or generated in various digital formats. This capturing means receives the digits output from the telecommunications equipment, translates the digits into digital format (if not already digital) and stores them in a temporary memory, register or similar component. In the embodiment shown in FIG. 2b, the capture means includes DTMF decoder (U1), which captures and converts DTMF-encoded digits (from the telecommunications equipment via Vsw) into a digital data word (D0–D3), which is then saved in a register (not shown) associated with microprocessor U2.

The digits received from the telecommunications equipment are compared against a function table, which in the embodiment shown is maintained in memory U3. Alternatively, the function table could be stored in on-board memory within the microprocessor (where available). Preferably, the memory is non-volatile. In particular, the memory contains at least one function word and for each function word there is an associated telephone number. As shown in FIG. 2b, memory U3 is a random access, re-writable, serial data input/output device. Of course, the memory could have a parallel data output and could even be a sequential memory device that sequentially reads out data words for comparison with the captured word toward determining whether there is a match. No matter the memory type and format, in instances where a matching function word is found in the memory, intercept device 100 will be used to re-dial a substitute telephone number so as to provide the user various functionality. In one embodiment, the table might contain entries that result in the following substitutions/functionality:

| Digits Generated by Telecommunications Equipment | Contained in Memory? | Passed Onto Telephone Company Network |
| --- | --- | --- |
| Local Telephone Number | NO | Local Telephone Number |
| Long Distance Telephone Number | "1" + not "0" | Carrier code + Telephone Number |
| Carrier code + Long Distance Telephone Number | NO | Carrier code + Long Distance Telephone Number |
| Old Alarm Company Telephone Number | Old Alarm Company Telephone Number | New Alarm Company Telephone Number |
| Patient Monitor Number | Old Patient Monitoring Number | New Patient Monitoring Number |
| 800 number | NO | 800 number |
| 911 | NO | 911 |
| #0 | "#0" | Customer service |
| 411 | "411" | Preprogrammed Directory Assistance Number |

Microprocessor U2 operates as a control means for the telephone intercept device. Of course, it would be known to those skilled in the art that an ASIC, PLA or other specific purpose circuit could be used in place of a general purpose microprocessor. First, the control means generates various signals toward controlling various aspects of the intercept device. In particular, "Seize" controls the opening and closing of electrically-controlled switching circuit 110, such that when Seize is active, telecommunications equipment is disconnected from telephone company network 10. The control means opens switching circuit 110 to allow the intercept device to dial out a substituted number and ultimately closes switching circuit 110 after dialing out that associated telephone number.

Control means also forces the first circuit, via "Pwr" to maintain (or latch) the operable connection between voltage regulator 140 and telephone company network 10 so as to maintain power for intercept control device 100 during operation. In fact, this signal is required to maintain the necessary connection between the central office and voltage regulator 140 while the telecommunication devices are disconnected from the telephone company network (via operation of "Seize"). The control means additionally activates second circuit 130 by powering "Hook."

Second, the control means—after waiting for dial-tone from the telephone company network—dials out the substitute telephone number associated with the captured series of digits. In the embodiment shown in FIG. 2b, microprocessor (U2) develops DTMF encoded signals using a wave table containing pulse width modulation data correlating to the appropriate DTMF frequency pairs, which are algebraically summed together and communicated out to the telephone company network via TxD. In particular, TxD modulates Vsw via transistor Q7 and Vsw is, in turn, operably connected, through the first circuit, to the telephone company network.

In one embodiment of the present invention, the telephone intercept device may further accept interrupt-type events from event monitors associated with consumer unit 20. This event monitor could be a gas gauge on the propane tank, a temperature gauge, an independent smoke detector, or carbon monoxide detector and any other monitoring events that may be desirably reported to a remote receiving station. These monitors are connected to telephone intercept device 100 via JP2. As shown in FIG. 2a., pursuant to telephone company regulations, the signal from the event monitor will have to be electrically isolated from the telephone intercept device. FIG. 2a, shows an optical isolation technique, however, other acceptable forms of electronic isolation can be used so long as they meet current telephone company regulations.

The signals received via JP2 should have a relatively lengthy preamble, long enough to trigger the first circuit into an off-hook condition so as to allow the voltage regulator sufficient time to provide power to the control means. In turn, the control means will latch the supply voltage "on" using "Pwr" and, then monitor the data stream coming in to the intercept device from JP2 via the "Monitor" pin. During the preamble, the "Monitor" pin is also used to determine that the off-hook interrupt was due to a non-telephony device.

In an embodiment including non-telephone based device interrupts, the memory must also include a dedicated telephone number associated with the non-telephone based device interrupt. For instance, if the signal indicates a low propane pressure, the phone number would be to a propane gas delivery service. Additional digits dialed out by the device could be used to identify the address, account number or other identification associated with the consumer unit or non-telephone based device. Similarly, a modem could be added to the intercept device to allow transmission of greater amounts of data related to the non-telephone based device interrupt over the telephone company network.

An embodiment including non-telephone based device interrupts, also includes a second control means for performing many of the same functions as performed upon a telecommunication equipment event, including (i) forcing the first circuit to operably connect the voltage regulator to said telephone company network, (ii) activating the second circuit, (iii) waiting for dial-tone from telephone company network, (iv) dialing out the dedicated telephone number after waiting for dial tone; and also some functions that are different, such as (v) transmitting information associated with the non-telephone based device.

The general operation of telephone intercept device 100 is outlined in FIG. 3. Upon an off-hook event (i.e. a signal via JP3 or JP2) (step 200), the first circuit connects voltage regulator 140 to telephone company network 10 (step 201). In an embodiment containing a non-telephone based device, the control means determines whether the interrupt was caused by JP3 (telecommunications equipment) or JP2 (monitoring event) by sampling the value of the "Monitor" pin (step 202). If the interrupt was caused by the off-hook of telecommunications equipment (JP3), means for capturing digits in sequence, captures the digits generated by the telecommunications equipment and accumulates these digits in temporary memory (such as a register) (step 203). The temporary memory accumulates a predetermined variable number of digits dependent upon the value of the first digit(s), which in one possible embodiment could be as follows: if "#" (or "*") collect next digit only; if "1" collect next 10 digits; or if "01" collect unlimited number of digits until a time-out event (i.e. no digits entered within a predetermined period of time (on the order used by telephone companies for similar purpose)).

The accumulated digits are then compared against the function words in memory (contained in U3 in the circuit disclosed in FIG. 2b.) (step 204). If the accumulated digits are not in the table, the program flow advances to step 212 whereupon the register or memory is cleared and then outgoing signal is continually monitored for outgoing digits until the telecommunications equipment goes "on-hook." In this manner, at any point in a telephone call, another telecommunications device can obtain access to the telephone company network to communicate its interrupt over the telephone company network. This may be usefull in a number of situations. For instance, a home monitored patient who falls down while on the telephone and can not hang up the phone, but can activate the RF transmitter medallion that many home-monitoring units have, would not be able to reach their remote monitoring station because the premises' phone system is already "off-hook." However, with intercept device 100 installed, patient monitoring unit 12 can dial out because the device will mimic on-hook (and then send out the emergency data) even though the patient already has premises telephone 11 off-hook. Similar functionality is useful where a home alarm system event occurs unbeknownst to a consumer while they are talking on the premises telephone.

If the accumulated digits (from step 203) are in the function table in memory, intercept device must disconnect the current telephone call from the network using the electrically-controlled switching circuit by operation of the "Seize" signal (step 206), but doing so would cut off the power to voltage regulator 140 unless power is first latched by the "Pwr" signal (step 205). Thus, to the telephone company it appears as if the telecommunication equipment went briefly "on-hook" even though the equipment, itself, did not (step 207).

Now, intercept device 100 must regain a connection to the telephone company network by mimicking off-hook using second circuit 130 as activated by the "Hook" signal, which is generated by microprocessor U2 (step 208). It is known that the central office will respond with a line and dial tone within a predetermined period of time. Device 100 can wait this period plus a time cushion to ensure proper operation or alternatively, device 100 can include a circuit for detecting the receipt of the dial tone frequency. After receiving dial tone (via either approach), the microprocessor dials out the substitute number as stored in memory (step 209). Thus, intercept device 100 has now redirected the telephone call instituted by the telecommunications equipment. At this point, the telecommunications equipment can be reconnected to the telephone company network by closing the electrically-controlled switching circuit by negating the "seize" signal (step 210). The flow then advances to step 211 where the power is unlatched from voltage regulator 140 by negating the "Pwr" signal.

In the case of a telephony device off-hook event, intercept device 100 is still powered from the telephone company network via voltage regulator 140 because the telephone based device is still off-hook. Accordingly, steps 212 and 213 continue monitoring for digits until an on-hook event. As noted above, in this manner, at any point in a telephone call, another telecommunications device can obtain access to the telephone company network to communicate its interrupt. Some of the situations in which this functionality may be useful are described above. It should also be noted in the event the premises phone is off-hook and the home alarm system 13 is sounding a siren, that siren may interfere with this functionality via the premises phone. Thus, a dedicated line may be connected between intercept device 100 and home alarm 13 to temporarily disable the siren to allow detection of the dialed out digits. After a predetermined time, device 100 would allow the siren to be reactivated to deter any intruder or to help fire fighters locate the premises.

Upon the telecommunication equipment going on-hook, the voltage regulator loses power and the device shuts down until the next off-hook event.

In operation with a home alarm system, telephone intercept device is programmed to detect certain outbound telephone number sequences (in this instance the alarm subscriber's original security system monitoring service). The intercept device detects the telephone line entering the 'off-hook' state, and begins to monitor the outbound telephone number. Once the dialing has been completed, the Gateway evaluates the number for one of several conditions. If the number dialed matches the original central station telephone number, intercept device 100 places the alarm system on hold, flash hooks the phone line interrupting the call and reestablishing dial tone, it then dials the new central station monitoring number, and reconnects the alarm equipment. If the number did not match, or when the redirection process is completed, the telephone intercept device enters a low-power dormant state waiting for the next outbound call.

In an embodiment including the non-telephone device interface (i.e., via JP2), in the event of a non-telephony device interrupt there is no telecommunications equipment off-hook in the first place to provide power to the voltage regulator. Thus, device 100 must use the required preamble on the data word via D3 to trigger the first circuit long enough for microprocessor U2 to trigger the "Pwr" signal to latch the first circuit on and, thus, ensure continued supply voltage from the telephone company network 10 to voltage regulator 140 (step 220). The device then signals off-hook by activating the second circuit via signal "hook" (step 221) and after waiting for dial tone (either by the predetermined time method or with an active "dial tone" monitoring approach), the control means dials out the telephone number associated with the interrupt (step 222) and thereafter transmits and receives any data associated with this interrupt event (step 223). Thereafter, the voltage regulator is unlatched and because this was a non-telephony device interrupt, the circuit shuts down (steps 211, 212 and 213).

Operation disclosed above broadly discloses a method for intercepting a telephone number dialed from telecommunications equipment in a consumer unit for transmission onto a telephone company network. This method comprises the steps of: (1) powering a device with a supply voltage from the telephone company network; (2) accumulating digits from the telephone number dialed from the telecommunications equipment; (3) comparing the accumulated digits with one or more function words; (4) disconnecting the telecommunication equipment from the telephone company network upon locating a match between the accumulated digits and one of the one or more function words; (5) temporarily mimicking on-hook status; (6) mimicking off-hook status; (7) waiting for dial tone from the telephone company network; (8) dialing out a telephone number associated with the matched one of the one or more function words; and (9) reconnecting the telecommunication equipment to the telephone company network.

In one intended commercial embodiment of the present invention, the discrete components have the following noninal values:

| | |
|---|---|
| C1 | 22 uF 35V |
| C2 | .1 uF 200V |
| C3 | 100 uF 16V |
| C4, C5 | 100 pF |
| C6, C7, C10, C11, C12, C13, C14, C15, C17 | .1 |
| C8, C9 | 22 p |
| C16 | 22 uF 6.3V |
| D1 | 1 A |
| D2, D3, D6 | 1N4148 |
| D4, D5, D7 | 1N5244 |
| D8, D9 | 1N4004 |
| D10 | ZR431C |
| ISO1 | 4N25 |
| Q1 | MPSA92 |
| Q4, Q2 | BS107P |
| Q3, Q5, Q6, Q7, Q10, Q11 | MPSA42 |
| Q9, Q8 | ZVN4244 |
| RV1 | 225V 55J |
| R1 | 100 |
| R2, R3, R12, R24, R25, R26, R27 | 10k |
| R4, R10 | 1.2k |
| R5, R7, R8 | 10M |
| R6, R28 | 27k |
| R9 | 680k |
| R11 | 1k |
| R14, R13 | 2.7k |
| R15, R18, R19, R20, R21, R22 | 100k |
| R16 | 33 |
| R17 | 1M |
| R23 | 300k |
| U1 | HT9170 |
| U2 | P1C16C58 |
| U3 | X24C04 |
| Y1 | 16 MHz |
| Y2 | 3.57 MHz |

The foregoing description and drawings merely explain and illustrate the invention and the invention is not limited thereto. Those of the skill in the art who have the disclosure before them will be able to make modifications and variations therein without departing from the scope of the present invention.

What is claimed is:

1. A telephone intercept device interposed between a telephone company network and telecommunications equipment in a consumer unit, said telecommunications equipment sending at least one digit toward said telephone company network, said telephone intercept device comprising:

a voltage regulator having a small quiescent current requirement and drawing a supply voltage from said telephone company network;

an electrically-controlled switching circuit operably disposed between said telecommunications equipment and said telephone company network, said electrically-controlled switching circuit having an open and a closed position;

a first circuit operably disposed between said telephone company network and said voltage regulator, said first circuit also being operably connected to said electrically-controllable switching circuit such that said first circuit operably connects said voltage regulator to said telephone company network upon said telecommunications equipment assuming an off-hook state while said electrically-controlled switching circuit is closed;

a second circuit operably connected to said telephone company network, said second circuit mimicking an off-hook state;

means for capturing each one of said at least one digit in sequence from said telecommunications equipment into a dialed digit word;

memory containing at least one function word, each of said at least one function word having an associated telephone number; and control means for (i) opening said electrically-controlled switching circuit, (ii) forcing said first circuit to operably connect said voltage regulator to said telephone company network, (iii) activating said second circuit, (iv) waiting for dial-tone from said telephone company network, (v) dialing out said associated telephone number after waiting for said dial tone; and (vi) closing said electrically-controlled switching circuit after dialing out said associated telephone number, said control means operating only when said dialed digit word corresponds to one of said at least one function word;

said voltage regulator providing power to said capturing means, memory and control means.

2. The invention according to claim 1 wherein each of said at least one digit is a DTMF signal, said capture means includes a DTMF decoder.

3. The invention according to claim 2 wherein said control means includes a wave table for generating each possible set of DTMF codes.

4. The invention according to claim 3 further comprising a filter tuned to remove any non-DTMF code frequencies generated by said control means.

5. The invention according to claim 1 wherein said control means includes a wave table for generating each possible set of DTMF codes.

6. The invention according to claim 5 further comprising a filter tuned to remove any non-DTMF code frequencies generated by said control means.

7. The invention according to claim 1 further comprising a filter tuned to remove any unwanted signals from the associated telephone number generated by said control means.

8. The invention according to claim 1 further comprising a modulating amplifier for modulating said dialed out associated telephone number.

9. The invention according to claim 1 wherein said first circuit is a comparator circuit formed of discrete components.

10. The invention according to claim 1 wherein said second circuit is a gyrator circuit.

11. The invention according to claim 1 wherein said electrically-controlled switching circuit is an AC switch.

12. A telephone intercept device interposed between a telephone company network and telecommunications equipment in a consumer unit, said telecommunications equipment sending at least one digit toward said telephone company network, said telephone intercept device comprising:

- a voltage regulator having a small quiescent current requirement and drawing a supply voltage from said telephone company network;
- an electrically-controlled switching circuit operably disposed between said telecommunications equipment and said telephone company network, said electrically-controlled switching circuit having an open and a closed position;
- an auxiliary input for receiving signals from a non-telephone based device;
- a first circuit operably disposed between said telephone company network and said voltage regulator, said first circuit also being operably connected to said electrically-controllable switching circuit such that said first circuit operably connects said voltage regulator to said telephone company network upon one of (i) said telecommunications equipment assuming an off-hook state while said electrically-controlled switching circuit is closed and (ii) activation of said non-telephone based device;
- a second circuit operably connected to said telephone company network, said second circuit mimicking an off-hook state;
- means for capturing each one of said at least one digit in sequence from said telecommunications equipment into a dialed digit word;
- memory containing at least one function word, each of said at least one function word having an associated telephone number, said memory further include a dedicated telephone number associated with said non-telephone based device;
- first control means for (i) opening said electrically-controlled switching circuit, (ii) forcing said first circuit to operably connect said voltage regulator to said telephone company network, (iii) activating said second circuit, (iv) waiting for dial-tone from said telephone company network, (v) dialing out said associated telephone number after waiting for said dial tone; and (vi) closing said electrically-controlled switching circuit after dialing out said associated telephone number, said control means operating only when said dialed digit word corresponds to one of said at least one function word; and
- second control means for (i) forcing said first circuit to operably connect said voltage regulator to said telephone company network, (ii) activating said second circuit, (iii) waiting for dial-tone from said telephone company network, (iv) dialing out said dedicated telephone number after waiting for said dial tone; and (v) transmitting information associated with said non-telephone based device, said second control means operating only upon activation of said non-telephone based device;
- said voltage regulator providing power to said capturing means, memory and first and second control means.

13. The invention according to claim 12 wherein said auxiliary input electrically isolates said telephone intercept device from said non-telephone based device.

14. A method for intercepting a telephone number dialed from telecommunications equipment in a consumer unit for transmission onto a telephone company network, said method comprising the steps of:

- powering a device with a supply voltage from the telephone company network;
- accumulating digits in the telephone number dialed from the telecommunications equipment;
- comparing the accumulated digits with one or more function words;
- disconnecting the telecommunication equipment from the telephone company network upon locating a match between the accumulated digits and one of the one or more function words;
- temporarily mimicking on-hook status;
- mimicking off-hook status;
- waiting for dial tone from the telephone company network;
- dialing out a telephone number associated with the matched one of the one or more function words; and
- reconnecting the telecommunication equipment to the telephone company network.

* * * * *